Feb. 3, 1959  E. A. BROWN ET AL  2,872,257
SEALING MEANS FOR ROLLER BEARINGS
Filed June 27, 1955

*INVENTORS*
EDGAR A. BROWN
CHARLES C. ZULEEG
BY
J. K. Mosser
AGENT

United States Patent Office 2,872,257
Patented Feb. 3, 1959

2,872,257

SEALING MEANS FOR ROLLER BEARINGS

Edgar A. Brown, Owego, and Charles C. Zuleeg, Vestal, N. Y., assignors to International Business Machines Corporation, New York, N. Y., a corporation of New York Application June 27, 1955, Serial No. 518,016

2 Claims. (Cl. 308—187)

The invention relates to sealing means and more particularly to a combination sealing and auxiliary lubrication means for rolling type bearings.

This is a continuation-in-part of our copending application, Serial No. 408,690, filed February 8, 1954, now Patent Number 2,810,622, and assigned to the assignee of the present invention.

It is one of the objects of the invention to provide auxiliary means for the lubrication of rolling element bearings.

It is another object of the invention to provide an auxiliary lubrication means for rolling element bearings which assures a longer life than is otherwise possible by the lubrication means normally contained within each bearing device.

It is still another object of the invention to provide a rolling element bearing with a sealing means which maintains an adequate quantity of lubricant on the bearing surfaces.

It is yet another object of the invention to provide a permanently lubricated rolling type bearing assembly with an external fluid seal which develops a pressure head to oppose the centrifugal extraction of lubricant from the bearing assembly.

It is still another object of the invention to provide a permanently lubricated high speed rolling bearing assembly having a rotating outer race with an external annular ring of grease which rotates with the race and develops a fluid pressure head in opposition to the lubricant pressure head developed within the bearing to thereby prevent the escape of lubricant from the bearing assembly.

Many types of permanently lubricated rolling bearing assemblies incorporating grease as a lubricant have been proposed and have proved satisfactory for specific applications. Because most standard rolling bearing seals are grease tight but not oil tight at high speed operation, it is difficult to retain the enclosed lubricant for prolonged periods under high speed operation. This is due to centrifugal force acting on the grease to extract the oil or lubricant which in turn develops a pressure head thereon and eventually forces some of the lubricant around the standard sealing means. When this occurs, the bearing may run dry and be permanently damaged, unless this condition is detected in time and additional lubricant is added to the bearing.

While some bearing installations permit periodic inspections, other installations are not in accessible spots and it is either very difficult or not expedient to dismantle the apparatus for this check. While not limited thereto, this invention is directed to one of the latter type installations wherein a rotating magnetic drum for use in high speed calculators is journaled on a pair of spaced ball bearing assemblies. The drum is mounted on the outer races for the balls and the inner races are secured on a stationary shaft or the like. A measured quantity of bleeding type channeling grease providing the permanent lubrication for the balls is disposed between the inner and outer races and the usual end sealing rings or shields which have their outer periphery secured or fitted to the outer race.

Disposed on opposite sides of the outer race is an inwardly opening annular channel, having a quantity of the same bleeding type channeling grease substantially uniformly distributed therein to provide an annular ring of grease in contact with the adjacent sealing ring and outer race. Thus, under operating conditions with the outer race and sealing ring rotating at high speed, the lubricant in the grease enclosed within the bearing is centrifugally extracted to lubricate the bearing surfaces, and in so doing develops a pressure head which tends to force the lubricant around the joint provided by the sealing ring and outer race. However, at the same time, the lubricant in the outer grease ring is likewise extracted and develops a pressure head opposed to that within the bearing. This nullifies the tendency for the lubricant to escape from the bearing assembly. With a proper radial thickness of grease in the outer ring, an external head can be developed to insure that any leakage through the joint will be inward toward the bearing. This outer ring of grease then acts as a lubricant reservoir.

Since the extracted lubricant leaves the grease during high speed operation, when the drum is stopped or is reduced in speed, a major portion of the lubricant is reabsorbed by the grease to thus automatically maintain the proper quantity of lubricant available for operating conditions over extended periods without dismantling the assembly for inspection.

Other objects of the invention will be pointed out in the following description and claims and illustrated in the accompanying drawings, which disclose, by way of examples, the principle of the invention and the best mode, which has been contemplated, of applying that principle.

Figure 1:
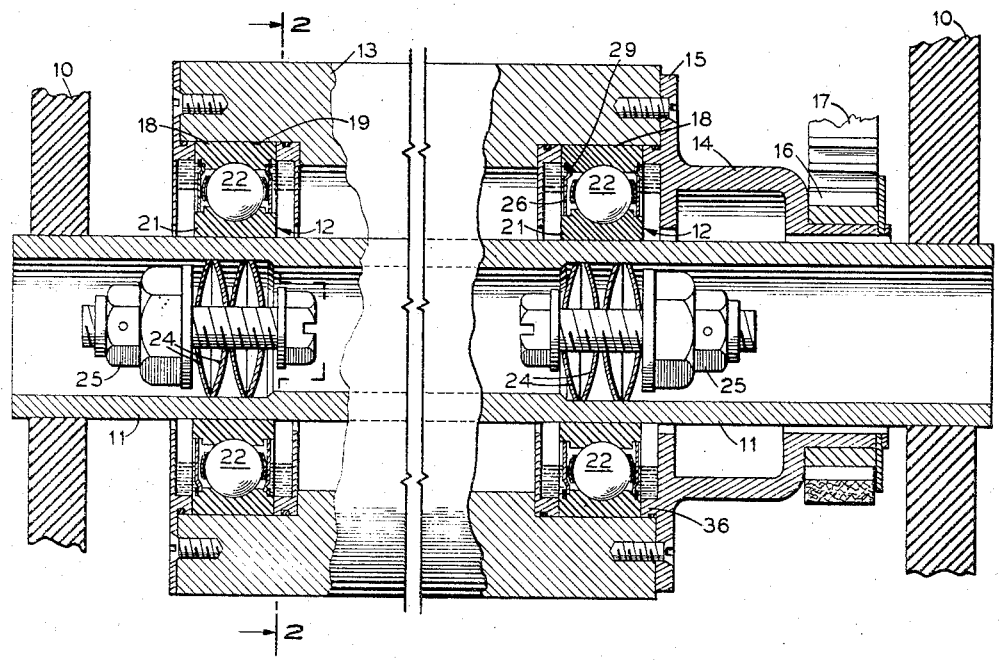
Fig. 1 is a partial longitudinal sectional view of the improved combination bearing seal and reservoir applied to a rotatable drum construction.
Figure 2:
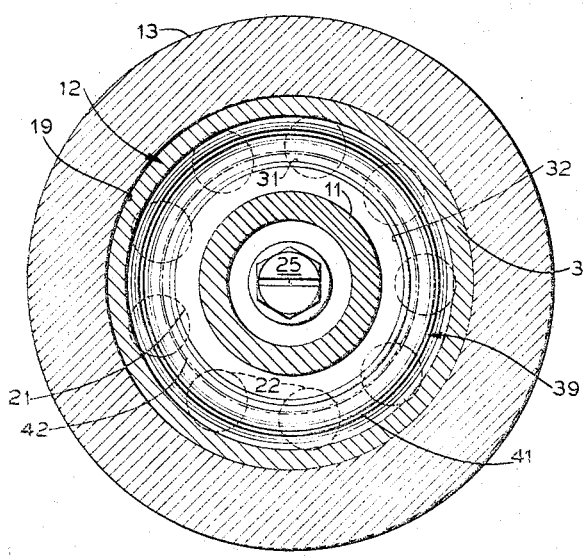
Fig. 2 is a transverse vertical sectional view taken on the line 2—2 of Fig. 1 showing the annular grease retaining channel.

Referring now to the drawings, there is shown a housing 10 having mounted thereon a stationary tubular supporting shaft or member 11 embraced by a pair of longitudinally spaced ball bearing assemblies 12 which are adapted to journal a rotatable drum or cylindrical member 13 for rotation at high speed. In this modification, the disclosed drum 13 is provided with a bell-shaped driving member 14 embracing the stationary shaft 11 and has one end 15 secured to one end of the drum 13, while the other end includes a toothed portion 16 adapted to mesh with a toothed driving belt or the like 17 to rotate the drum at the desired speed. This drum is provided with a magnetizable peripheral surface on which data is impressed in the form of magnetized spots, in any suitable manner, for use in a calculator or other data processing equipment.

While the bearing assemblies 12 are standard with respect to the various elements, the particular bearings used in this installation are special with respect to accuracy and the detailed structural features. Since the two bearing assemblies 12 are identical, only one will be described in detail. Basically, each bearing assembly 12 includes an outer race 18 pressed into a shouldered end opening or recess 19 in the drum 13 to frictionally grip the same, an inner race 21, mounted on the stationary tubular shaft 11 for support, and a plurality of rolling type elements or balls 22 circumferentially spaced by a ball retainer 23 between the races in the usual manner.

As mentioned in the above application, a minimum eccentricity of the drum 13 is essential. Thus, the bearing assemblies are adjusted to provide for substantially zero clearance when the drum is rotating at its operating speed of 12,500 R. P. M. This adjustment is accomplished by inserting a group of oppositely facing dished washers or the like 24 within the tubular shaft 11 beneath the inner race 21 and radially compressing them by means of a bolt or the like 25. In this manner the washers 24 radially expand the tubular shaft 11 which in turn radially expands the inner race 21 to reduce the ball bearing clearance to substantially zero. Since the bearing adjustment forms no part of this invention, a further detailed description is not deemed necessary.

Figure 3:
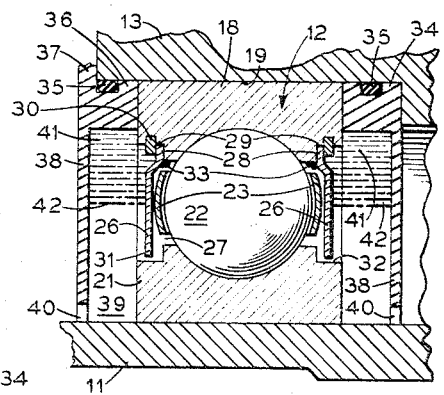
Fig. 3 is an enlarged partial sectional view of the ball bearing assembly with the improved sealing means applied thereto.

Referring now more particularly to Fig. 3, the balls 22 are enclosed by a pair of annular bearing sealing rings or shields 26 which cooperate with the inner and outer races to define a combined ball enclosing and lubricant retaining chamber 27. The outer periphery of each sealing ring 26 closely fits a shoulder 28 provided by an end opening recess in the outer race. While the outer circumference of the sealing ring closely fits the recess in the outer race and provides a grease-tight seal or joint 29 thereat, it is not of such dimension to stress the outer race. In order to hold the sealing rings 26 in place, a split or wedge ring 30 is snapped into an inwardly opening groove provided in the outer race 18 adjacent the periphery of the sealing rings. Each sealing ring 26 has an inner edge 31 which terminates with the proper running clearance at an annular recess 32 provided adjacent each end of the inner race 21.

In order to permanently lubricate the balls, a charge of heavy channeling bleeding type grease is placed on the outer race, after which it is rotated to build up a ring of grease 33 on both sides of the balls. These rings of grease lie in the pockets or corners provided by the shoulders 28 on the outer race 18 and the sealing rings 26 out of contact with the balls 22 to thus avoid the temperature rise inherent in greases of this type when contacting relatively moving parts. In this particular construction the permanent lubrication charge for the balls amounts to approximately 900 milligrams of "Andoc C" heavy channeling bleeding type grease. Under operating conditions with the outer race 18, sealing rings 26 and grease being rotated at 12,500 R. P. M., the lubricant is extracted from the grease and provides an oil film to lubricate the bearing surfaces between the cooperating balls and raceways.

With a construction of this type it can be seen that while the seals or joints 29 provided between the shoulders 28 on the outer race 18 and the sealing rings 26 are grease tight, they may not be oil tight. Thus, over a period of time, minute portions of the extracted lubricant are forced through the joints and eventually the bearing will run dry. Due to the fact the initial grease charge is limited to a relatively low volume to avoid contact with the relatively moving parts and thus maintain the temperature rise at a minimum and still provide adequate lubrication, it is essential to prevent the escape of lubricant from the bearing assembly 12.

It is to the elimination of the above problem that the invention is particularly directed. As shown, an inner annular grease retaining frame or insert 34 is mounted in the recessed portion 19 of the drum 13 in contact with the outer race 18 to hold the same against axial displacement. In addition, the insert carries an O-ring seal 35 around its outer periphery for engagement with the recess 19 to seal against discharge of lubricant therearound. The opposite or outward facing sides of the outer races are abuted by annular inserts 36, formed as part of the end bell 14 and a cap member 37, respectively, each of which includes the O-ring seals 35 for sealing against escape of lubricant. Each annular rotatable insert further includes an integral annular inwardly opening web or wall 38 which is axially spaced from each side of the outer race 18 and the adjacent sealing ring 26 and cooperates therewith to define an inwardly opening channel 39. The inner circular edges 40 of the webs 38 provide running clearance with respect to the stationary tubular shaft 11. As shown, each grease sealing joint 29 is exposed to a related channel 39.

Disposed within the space provided by each inwardly open channel 39 is a ring of grease 41, having a substantially uniform depth or radial thickness, which provides the combination seal and reservoir for the lubricant confined within the chamber 27 of the bearing assembly 12. The radial depth or dimension of the grease 41 in the channels 39 may vary from a radius slightly less than the inner periphery of the outer race 18 to a radius greater than the inner edge of the rotating sealing ring 26. However, the grease should not contact the inner race 21 or any other stationary part, for the reasons previously mentioned. The grease in the channels 39 is the same type as used in the bearing assembly and is of such viscosity to stay channeled and resist flow during both rotation of the drum and the standing or idle times.

From the above it can be seen that during rotation of the drum 13, the lubricant extracted from the enclosed inner rings of grease 33 in the bearing chamber assembly develops a pressure head. However, with each side of the bearing assembly provided with the external annular ring of grease 41 any danger of leakage through the sealing ring joints 29 is nullified because the external extracted lubricant reacting on the outside of the bearing assembly 12 develops a pressure head which is at least equal to or greater than the pressure head developed by the enclosed lubricant. In fact, if an external difference in head $h$ of grease is provided in the channels 39, a higher external pressure head is developed and it reacts against the joints 29 so that as leakage therethrough takes place, the lubricant will flow inward to the confined portions or chamber 27 of the bearing assembly. This provides additional lubricant without increasing the volume of grease therein. In the latter condition the extracted lubricant in the channels 39 not only provides the seal, but in addition it acts as a lubricant reservoir for the confined ball bearings 22.

As the drum 13 is decelerated to rest, a portion of the extracted lubricant is reabsorbed by the grease and remains equally or uniformly dispersed throughout the same to insure proper balance conditions. Another feature of this improved arrangement is that the exposed cylindrical surface 42 of the grease in the channel 39 becomes oxidized and provides a seal to prevent the dissipation of the lubricant in that direction. With a construction of this type, high speed operation can be realized over prolonged periods with very little or no maintenance requirements by the bearings.

In some installations it may not be desirable to recess the outer race 18 to carrying the sealing ring 26. Under such conditions the sealing rings could be carried between the inserts and outer races. In addition the sealing rings 26 may be formed from sintered metal having the proper density to provide a porous construction which would be capable of transmitting small quantities of lubricant from the channel 39 to the chamber 27.

From the foregoing, it can be seen a permanently lubricated rolling type bearing has been provided in which the means for sealing the lubricant within the bearing assembly comprises the same material as that required for lubricating the bearing and that when leakage through the joint occurs, the leakage will be inward to the confined lubricant in the bearing to thus increase the bearing life.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A lubrication system for a rolling type bearing assembly comprising a plurality of circumferentially spaced rolling elements having a rotatable outer race and a stationary inner race for guiding said rolling elements, a sintered metal sealing ring having an outer periphery mounted at each side of said outer race and cooperating with said races to define a chamber for enclosing said rolling elements and retaining a quantity of lubricant therein, and means disposed on each side of said bearing assembly to provide an inwardly opening channel, said channel having an annular ring of grease disposed therein with a radial depth to cover a portion of said sintered metal sealing ring and to develop a pressure head in excess to that developed by the lubricant in said chamber when said outer race and channel are rotated, whereby a portion of the external lubricant is forced through said sintered metal sealing rings by the differences in the pressure heads to supply additional lubricant to said chamber.

2. A bearing lubrication system for a rotatable drum mounted for high speed rotation about a stationary supporting member, comprising a permanently lubricated ball bearing assembly including a plurality of circumferentially spaced balls journaled between an outer race secured to said drum and a stationary inner race mounted on said stationary support, a sintered metal sealing ring having an outer periphery secured to each side of said outer race to provide a grease seal thereat but opening toward said inner race and defining a bearing and lubricant retaining chamber, and means carried by said drum to provide an inwardly opening channel adjacent each side of said sintered metal sealing rings, said channels having an annular ring of grease disposed therein with a radial thickness to at least cover the outer periphery of said sintered metal sealing rings but out of contact with the stationary inner race, said grease being rotatable with said drum to develop an external fluid pressure head acting against the sintered metal sealing ring to prevent the escape of lubricant from said bearing and lubricant retaining chamber.

References Cited in the file of this patent

UNITED STATES PATENTS

| | | |
|---|---|---|
| 2,647,808 | Spurgeon | Aug. 4, 1953 |
| 2,689,771 | Annen | Sept. 21, 1954 |